Oct. 6, 1925.
B. C. VAN EMON
1,555,851
VALVE
Filed July 2, 1923
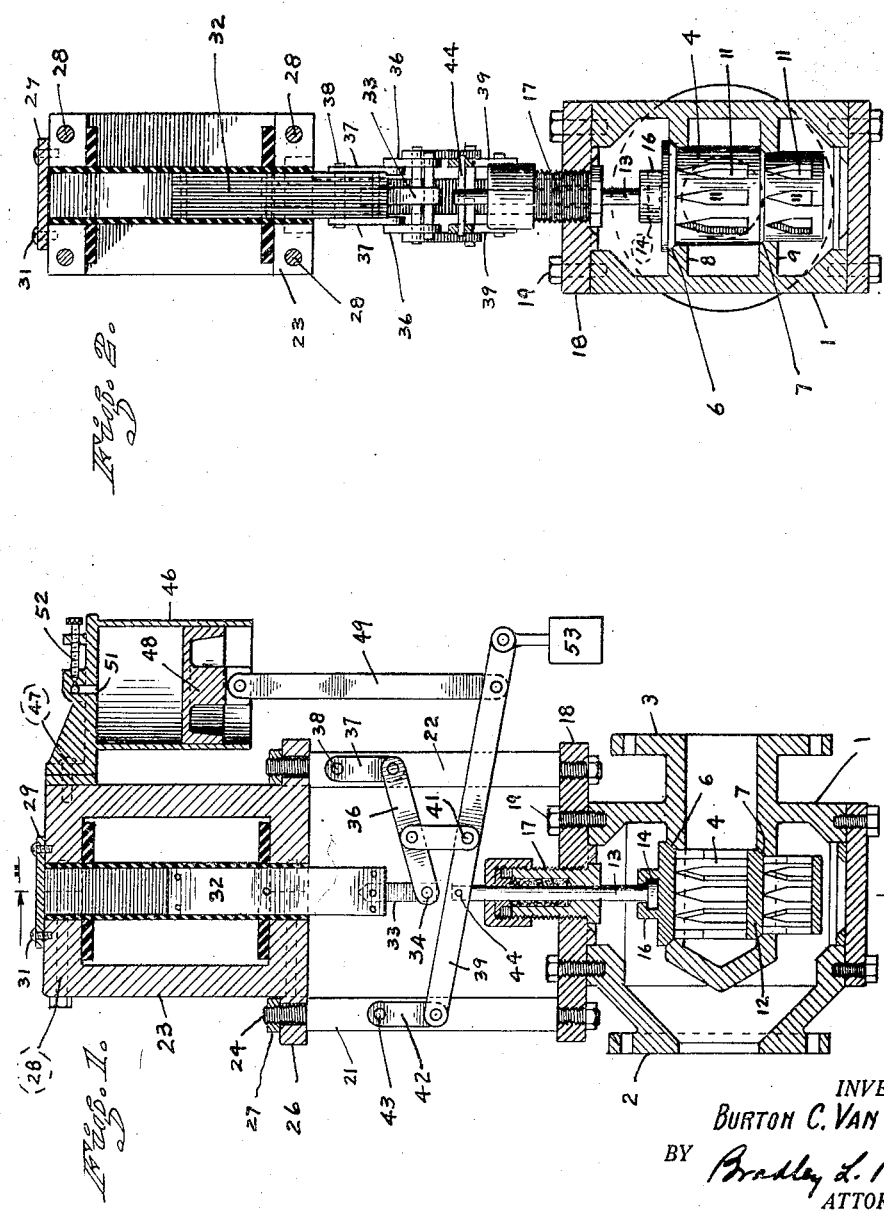
INVENTOR.
BURTON C. VAN EMON
BY Bradley L. Benson
ATTORNEY Patented Oct. 6, 1925.

1,555,851

UNITED STATES PATENT OFFICE.

BURTON C. VAN EMON, OF SAN FRANCISCO, CALIFORNIA.

VALVE.

Application filed July 2, 1923. Serial No. 648,970.

*To all whom it may concern:*

Be it known that I, BURTON C. VAN EMON, a citizen of the United States of America, residing at 235 First Street, San Francisco, in the county of San Francisco and State of California, have invented certain new and useful Improvements in Valves, of which the following is a specification.

The present invention is an electrically operated control valve.

The objects of this invention include;

(*a*) the provision of a control valve for liquid operated devices which may be interposed on a fluid line and electrically operated to open and close and thereby govern the work done by said liquid;

(*b*) the provision of means associated with the valve whereby said opening and closing operations will be gradually accomplished to effect smoothness of operation;

(*c*) the provision of a valve suitable for use with hydraulically operated elevators whereby the fluid operating the elevator may be held in any position for an indefinite period of time and released or held at any stage of operation without undue jar or pound. Other objects and advantages will appear as this description proceeds.

In the accompanying one sheet of drawings,

Figure 1 is a vertical cross section of my valve housing and showing solenoid means for reciprocating the valve, Fig. 2 is a section of Fig. 1 taken on the line II—II. Attention is called to my copending application for patent filed May 31, 1922, Serial No. 564,757, in which are shown but not claimed parts of the present disclosure.

Referring to the drawings, the numeral 1 indicates a valve housing provided with flanges 2 and 3 for connection with members of a pipe line not shown. The flow of liquid through the housing 1 is controlled by a cylindrical valve cage 4. This cage has conical valve faces 6 and 7 which seat (when the valve is in closed position) respectively in seats in partitional walls 8 and 9, Fig. 2, of the housing 1.

The cage 4 is provided with a plurality of slots 11 which are tapered at the top to allow a gradual flow of liquid therethrough as the valve is lifted from its seats.

It will be seen that there are two series of slots 11, one series affecting each of the valve seats 6 and 7, and that a floor 12 separates the cage into two compartments. As the area of the seats 6 and 7 are nearly equal a substantially balanced pressure exists on the cage 4.

To raise the valve cage 4 from its seats I provide a bolt 13 the head of which engages a groove 14 in a boss 16 integral with the cage 4. This bolt 13, which serves as a valve stem, extends through a packing gland 17 in a cover plate 18 secured to the housing by bolts 19. At 21 and 22 I show standards which support a solenoid housing 23 above the valve housing 1. These standards are reduced and threaded at each end as shown at 24. These threaded ends extend through holes in the cover plate 18 and through holes in flanges 26 of the solenoid housing 23 and are secured by nuts 27.

The solenoid housing 23 is formed of two hollow halves which are joined by bolts 28, and by a cover plate 29 carrying screws 31 engaging the two halves. Within the hollow housing thus formed a suitable coil of wire surrounds a movable core 32 (here shown of laminated type for alternating current). To the lower end of the core 32 is secured a stem 33. Pivoted at 34 to stem 33 are ends of levers 36 the opposite ends of which are pivoted to ends of links 37, pivoted at 38 to the standard 22.

The levers 36 are connected to levers 39 by links 41 pivoted at the ends to each of said levers. The levers 36 are pivotally connected with ends of links 42 pivoted at 43 to the standard 21. The levers 39 carry a pin 44 which extends through the bolt or valve stem 13. It results from this system of toggles and levers that, when the solenoid is energized, the core 32 rises slowly and lifts the cage 4 vertically from its seats.

In order to retard this lifting movement I provide a dash pot 46 secured to the solenoid housing by bolts 47. A piston 48 is connected to levers 39 by means of a link 49 pivoted at its ends to said piston and to said levers.

At 51 I show an air vent passage from the dash pot and at 52 I show a needle valve for determining the cross sectional area of said vent to predetermine the speed at which the dash will operate.

To assist in restoring the parts to the closed position shown in the drawings I provide a pendulum weight 53 pivotally suspended from the ends of levers 39.

The operation of my device is as follows:

Assuming that the valve housing 1 is connected on a pipe line supplying a hydraulic elevator, and that said elevator is raised by a ram driven by liquid forced through said pipe line, when the parts assume the position shown in the drawings the elevator will be at rest.

When it is desired to move the elevator in either direction an electric switch (not shown) is thrown closing a circuit which operates the pump or motor (not shown) and also energizes the solenoid in housing 23. This raises core 32 which in turn through levers 36 and links 41 raises levers 39, unseating cage 4 and allowing passage of liquid through the housing 1.

I claim:—

1. A liquid flow controlling mechanism, a conducting line, adapted to convey liquid to and from said mechanism, a valve on said line adapted to control the movement of said liquid, an electric solenoid for opening and closing said valve, and toggle mechanism for increasing the movement of said solenoid with reference to said valve, and means directly connected to said valve to assist in restoration of said valve to closed position.

2. A liquid flow controlling mechanism, a liquid conducting line, a valve on said line adapted to control said liquid, electrically operated means for said valve, and restraining mechanism connecting the electric operating means with the valve and adapted to limit the speed of movement of said valve.

3. A liquid flow controlling mechanism, a liquid conducting line, adapted to convey liquid to and from said mechanism, a valve on said line adapted to control the movement of said liquid, and a solenoid for operating said valve, toggle mechanism for increasing the movement of said solenoid with reference to said valve and a dash pot connected by said toggle mechanism to said valve.

4. A liquid flow controlling mechanism, a liquid conducting line adapted to convey liquid to and from said mechanism, a valve on said line adapted to control the movement of said liquid, a solenoid for operating said valve, and mechanism comprising a toggle connection between the solenoid and the valve for increasing the movement of said solenoid with reference to said valve.

5. A liquid flow controlling mechanism, a liquid conducting line adapted to convey liquid to and from said mechanism, a valve on said line adapted to control the movement of said liquid, said valve having a cage through which said liquid passes, said cage having tapered openings through which said liquid passes, whereby the pressure and volume of liquid increase gradually with the opening of the valve, a dash pot and piston therefor connected by toggle leverage to the valve to retard opening of said valve.

6. A balanced valve for controlling flow of liquid through a conducting ring, comprising a seating member, a cage carried thereby, a second seating member carried directly by said cage, a second cage carried by said second seating member, said cages having tapered slots through which liquid passes, whereby to cause a variation in the passage area in accordance with the movements of the valve.

In testimony whereof I affix my signature.

BURTON C. VAN EMON.